United States Patent [19]

Mülhaupt

[11] 4,434,052

[45] Feb. 28, 1984

[54] CENTRIFUGAL SEPARATOR

[75] Inventor: Bruno Mülhaupt, Schlieren, Switzerland

[73] Assignee: Escher Wyss Aktiengesellschaft, Zürich, Switzerland

[21] Appl. No.: 378,833

[22] Filed: May 17, 1982

[30] Foreign Application Priority Data

Jun. 25, 1981 [CH] Switzerland ........................ 4199/81

[51] Int. Cl.³ ............................................. B01D 33/06

[52] U.S. Cl. .................................... 210/376; 210/377

[58] Field of Search ............ 210/374, 376, 377, 380.3, 210/512.1, 512.3; 494/56, 58, 59

[56] References Cited

U.S. PATENT DOCUMENTS 1,944,391 1/1934 Altpeter ............................ 210/376

FOREIGN PATENT DOCUMENTS 948409 8/1956 Fed. Rep. of Germany ...... 210/376
1044721 11/1958 Fed. Rep. of Germany ...... 210/376
1092840 11/1960 Fed. Rep. of Germany ...... 210/376
1114149 9/1961 Fed. Rep. of Germany ...... 210/376
1119774 12/1961 Fed. Rep. of Germany ...... 210/376
2631160 1/1978 Fed. Rep. of Germany ...... 210/376
599853 4/1978 U.S.S.R. ............................ 210/376

*Primary Examiner*—Charles N. Hart
*Assistant Examiner*—John W. Czaja
*Attorney, Agent, or Firm*—Werner W. Kleeman

[57] ABSTRACT

A centrifugal separator, especially a pusher centrifuge is disclosed, wherein at least one rotatable sieve or filter drum is mounted within a housing. Within the sieve or filter drum there is arranged a to-and-fro displaceable pusher or thrust element, for instance in the form of a pusher floor member, which serves for displacing solid materials in the form of a filter cake towards outlet or discharge openings for the treated product. To process thin suspensions with the pusher centrifuge the pusher floor member is arranged for oscillating movement between two turning or deflection points preferably located at the region of an imaginary central line of the sieve or filter drum. A feed or supply pipe for the infeed of the suspension which is to be separated extends substantially coaxially with respect to the sieve or filter drum and its outlet or outflow opening, which extends radially outwardly, is located essentially at the center between the turning or deflection points of the pusher floor member.

10 Claims, 9 Drawing Figures

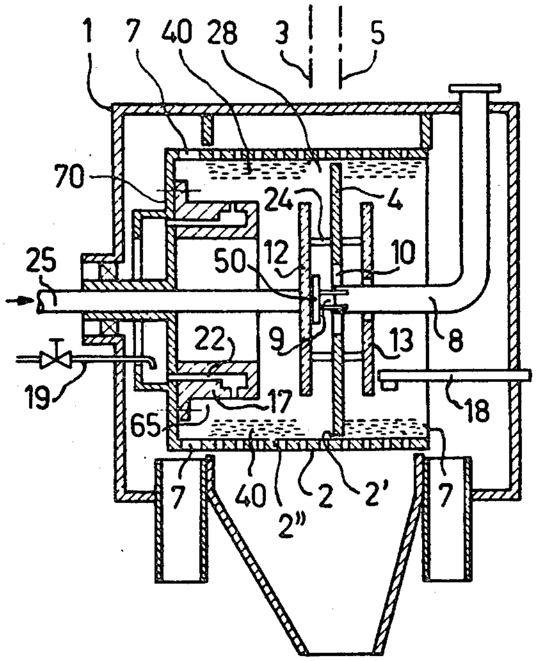
Fig. 1
Fig. 3
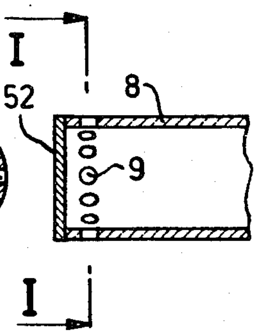
Fig. 3a
Fig. 2
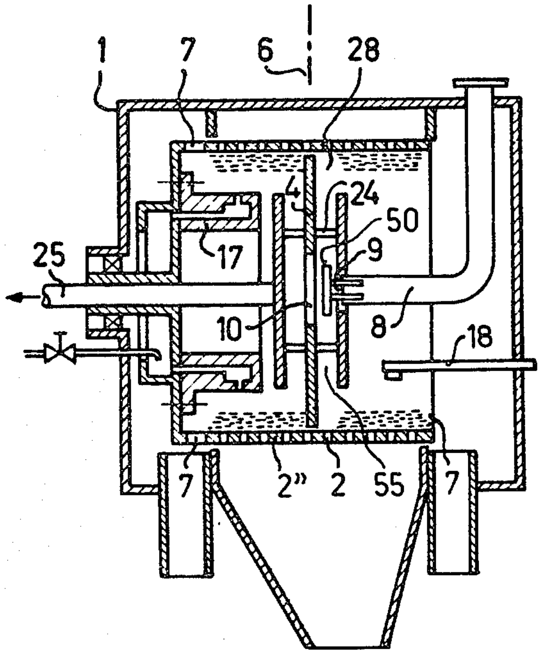
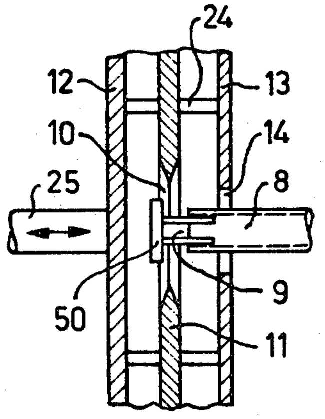
Fig. 4

CENTRIFUGAL SEPARATOR

BACKGROUND OF THE INVENTION

The present invention relates to a new and improved construction of a centrifugal separator, and, more particularly, to an improved design of pusher centrifuge.

Generally speaking, the pusher centrifuge of the present development is of the type comprising at least one sieve or filter drum rotatably mounted within a housing. Further, there is provided a substantially disk-shaped pusher or thrust member, typically in the form of a pusher or thrust floor member, which is arranged within the sieve or filter drum and essentially coaxially with respect thereto. This pusher floor member is rotatable and may be advantageously constructed to be displaceable to-and-fro between deflection or turning points relative to the sieve or filter drum in the lengthwise direction thereof. This pusher floor member wipingly moves along a longitudinal section of a sieve or filter surface of the sieve or filter drum and displaces a filter cake, i.e. the solid materials of the treated product along the sieve drum in the direction of outlet or discharge openings provided for the filter cakes.

Typical examples of centrifugal machines or separators have been disclosed, by way of illustration, in U.S. Pat. No. 1,928,341, granted Sep. 26, 1933, U.S. Pat. No. 1,944,391, granted Jan. 23, 1934, and U.S. Pat. No. 2,232,769, granted Feb. 25, 1941.

The generally known advantages of pusher centrifuges, such as higher product throughput and small residual moisture content, are counterbalanced by the drawback that the centrifuge only can be supplied with relatively high solid concentrations. If the infeed or input concentration of the product which is to be treated decreases, then there is present the danger of so-to-speak "flooding" the centrifuge. Under the expression "flooding", as used herein, there is intended to describe the operating condition where the dewatering or dehydration time between two strokes of the pusher floor member is insufficient to dewater the sump forwardly of the pusher floor member to such an extent that the filter cakes, i.e. the solid materials of the treated product can be transported. In the context of this disclosure the term "sump" is intended to designate the longitudinal section or portion of the sieve or filter drum which is wipingly contacted by the pusher floor member. In the event the dewatering or dehydration of the processed product is not sufficient, then there is still located within the sump, during the return movement of the pusher floor member, a suspension which can not be displaced in the form of a filter cake, so that there arises the aforementioned flooding.

In order to solve this problem, i.e. to obtain a sufficient dewatering action in the sump, various attempts have been made to incorporate additional sieve or filter surfaces in the centrifuge along the path of the suspension which is to be separated towards the sump. However, it was not heretofore possible with these facilities or measures to enlarge the field of application of the pusher centrifuge in terms of handling thinner suspensions.

When processing suspensions which tend to sedimentate relatively well such thin suspensions are initially concentrated by statically sedimentating the same and only thereafter are they inputted to the pusher centrifuge. In the case of suspensions which tend to sedimentate rather poorly there are used for the pre-concentrating operation possibly other machines, such as for instance centrifugal decanters, by means of which it is possible to also process thin suspensions. Yet, these systems are quite complicated in construction, and accordingly, rather expensive, frequently also tending to be problematic as far as the servicing and maintenance thereof is concerned.

SUMMARY OF THE INVENTION

Therefore, with the foregoing in mind it is a primary object of the present invention to provide a new and improved construction of centrifugal separator which is not afflicted with the aforementioned drawbacks and limitations of the prior art constructions.

Another and more specific object of the present invention aims at the provision of a new and improved construction of a pusher centrifuge which is capable of also reliably processing thin suspensions.

Yet a further significant object of the present invention is directed to a new and improved pusher centrifuge which is relatively simple in construction and design, quite economical to manufacture, extremely reliable in operation, not readily subject to breakdown or malfunction, and requires a miminum of maintenance and servicing.

Now in order to implement these and still further objects of the invention, which will become more readily apparent as the description proceeds, a preferred constructional embodiment of the pusher centrifuge of the present development is manifested by the features that, the deflection or turning points preferably are located to both sides of an imaginary central line of the sieve or filter drum. A feed or supply pipe or conduit is provided for the infeed of the suspension which is to be separated into the sieve or filter drum. This feed or supply pipe is arranged substantially coaxially with respect to the sieve drum. This feed pipe has an outflow opening for the infed suspension, which outflow opening extends radially towards the outside, and is located at the central region between both of the deflection or turning points of the pusher floor member. The pusher floor member possesses a central opening which frees a passage for the insertion of the feed or supply pipe through the pusher floor member, so that the outlet opening of the feed pipe, during the to-and-fro displacement of the pusher floor member relative to the outflow opening, is located alternately to the one or other side or face of the pusher floor member. At both sides or end regions of the sieve or filter drum there are provided outlet or discharge openings for the filter cakes.

By virtue of the inventive arrangement and construction of pusher centrifuge it is possible to carry out a novel treatment process of the suspension or product during the use of this pusher centrifuge. In particular, the flow of the instreaming suspension is only first allowed to enter the sump when the sump section or region is freed of the filter cake by the displacement of the pusher floor member, so that the liquid of the incoming suspension can readily flow through the freed sieve or filter surface. The distribution of the suspension which is to be separated at both drum portions, i.e. at the sumps or filter surfaces located to opposite sides of the pusher floor member, is accomplished automatically by displacing the pusher floor member, wherein, however, the flow of the suspension through the feed or supply pipe remains uninterrupted, so that there do not arise any pressure surges in the pipe conduit or line carrying the suspension which is to be treated.

According to a particularly advantageous construction of the inventive pusher centrifuge such is equipped with a washing device for washing the filter cakes at the sieve or filter surface of the sieve or filter drum.

According to a further embodiment of the invention it is possible to design the pusher centrifuge as a double-stage centrifuge. Here it is possible, for instance, to have one of the sieve or filter drums thereof move relative to the pusher floor member which is then, for instance, not shiftable back-and-forth.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a longitudinal sectional view of a first exemplary embodiment of pusher centrifuge wherein the pusher floor member is shown located at one deflection or turning point;

FIG. 2 illustrates the pusher centrifuge depicted in FIG. 1, however showing the same with the pusher floor member located at the other deflection or turning point;

FIG. 3 is a fragmentary longitudinal sectional view showing one possible construction of the feed or supply pipe;

FIG. 3*a* is a sectional view of the feed or supply pipe shown in FIG. 3, taken substantially along the line I—I thereof;

FIG. 4 is a fragmentary view, depicted on an enlarged scale, showing a detail of the pusher centrifuge construction of FIG. 1;

DETAILED DESCRIPTION OF THE PREFERRED EMBODIMENTS

Figure 5:
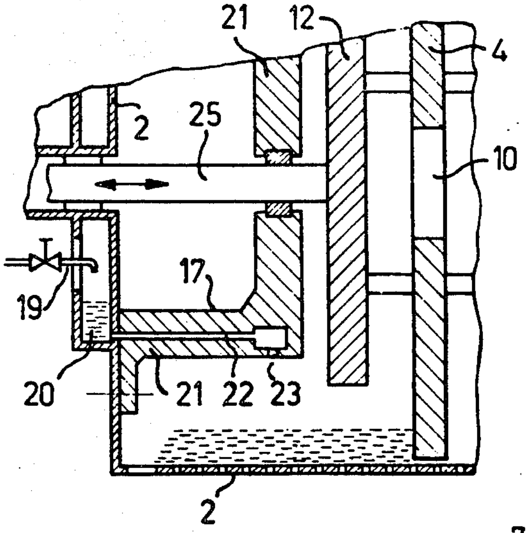
FIG. 5 is a fragmentary sectional view, again on an enlarged scale, showing a further detail of the centrifuge construction of FIG. 1.

Describing now the drawings, it is to be understood that only enough of the construction of the various exemplary embodiments of pusher centrifuge has been shown in the drawings as will enable those skilled in this art to readily understand the underlying principles and concepts of the present development, while simplifying the illustration of the drawings. Turning attention now to the embodiment of pusher centrifuge illustrated by way of example and not limitation in FIG. 1, it will be seen that within a housing 1 of such pusher centrifuge there is rotatably mounted in any suitable manner a sieve or filter drum member or drum 2. In the sieve or filter drum 2 and disposed essentially coaxially therewith is a substantially disk-shaped pusher element, here shown as a pusher or thrust floor member. As will be explained more fully hereinafter, this pusher floor member 4 is mounted to be rotatable within the sieve or filter drum 2 and can be axially displaced to-and-fro relative to the sieve or filter drum 2 in the lengthwise direction thereof between two deflection or turning points 5 and 6, and specifically as shown in FIG. 1, between the one deflection or turning point 5, and as shown in FIG. 2, the other deflection or turning point 6. During such to-and-fro movement of the pusher floor member 4 the latter wipingly contacts a longitudinal section 2' of a filter surface 2'' of the sieve or filter drum 2 which is located between the deflection points 5 and 6, and thus, in each instance displaces a so-called filter cake, generally indicated in FIG. 1 by reference numeral 40, along the sieve or filter drum 2 in the direction of the related outlet or discharge opening 7 provided for the purpose of delivering or outfeeding the filter cakes which have been formed from the processed product. Each time after the displacement of the filter cakes 40 in the direction of the outlet or discharge openings 7 and following the displacement of the pusher floor member 4 towards the momentary turning or deflection point 5 or 6, as the case may be, there is formed between the corresponding filter cake 40 and the pusher floor member 4 an empty space or region, the so-called sump, which has here been generally designated by reference character 28.

The deflection or turning points 5 and 6 are preferably located to both sides of an imaginary center line 3 of the sieve or filter drum 2, as best seen by referring for instance to FIG. 1. The pusher floor member 4 thus oscillates back-and-forth at the longitudinal section or region 2' of the sieve or filter drum 2 about this imaginary center line 3. For the infeed of a suspension which is to be separated into the sieve or filter drum 2 there is advantageously provided a suitable feed or supply pipe or conduit 8 which is arranged essentially coaxially with respect to the lengthwise axis of the sieve or filter drum 2. Product outflow or discharge opening 9 of the feed or supply pipe 8 is located at the central region between both of the deflection points 5 and 6 of the pusher floor member 4 and directs the flow of the suspension, i.e. the product to be treated radially towards the outside, i.e. in radial direction towards the sieve or filter surface 2'' of the sieve drum 2.

The pusher or floor member 4 has a central opening 10 which frees a passage for the insertion of the feed or supply pipe 8 through the pusher floor member 4 during its to-and-fro movement relative to the outflow or discharge opening 9. In this way the outflow or discharge opening 9 of the feed or supply pipe 8, during the to-and-fro displacement of the pusher floor member 4 relative to the outflow opening 9, is located alternately to the one or the other side or face of the pusher floor member 4. Consequently, there is always advantageously initiated the inflow or infeed of the suspension to be separated into the sump 28 when the pusher floor member 4, following the displacement of the filter cake 40, moves towards the next deflection or turning point, and thus, has freed the corresponding longitudinal section of the filter surface 2'', so that the liquid of the suspension is not hindered by any filter cake layer and can be effectively withdrawn through the sieve or filter surface 2'' of the sieve drum 2. In this way the filter cake 40 is displaced along the sieve or filter drum 2 in both longitudinal directions thereof. In order to remove the filter cake 40, constituting the processed product, out of the sieve or filter drum 2 there are provided at both sides or ends of the sieve drum 2 the aforementioned outlet or discharge openings 7 for such product.

The feed or supply pipe 8 can be provided with an impact plate 50 for deflecting the flow of the suspension radially outwardly with respect to such feed or supply pipe 8, as has been shown for instance in FIGS. 1, 2 and 4 at the end of the feed or supply pipe 8. However, it would also be possible, as best seen by referring to FIG. 3, to close the end of the feed or supply pipe 8 by means of a suitable cover or closure member 52 and to arrange a plurality of outlet or outflow openings 9 about the circumference of the feed or supply pipe 8 in order to permit the requisite outflow of the infed suspension or the like.

As will be particularly apparent by referring to FIG. 4, the wall portion 11 of the pusher floor member 4 and which delimits the central opening 10 provided in such pusher floor member 4, may possess a substantially wedge-shaped cross-sectional configuration which is directed towards the radially outwardly directed flow of the incoming stock suspension and serves to distribute the flow of the stock suspension to both sides or faces of the pusher floor member 4.

Advantageously, there is secured at the pusher floor member 4 to both sides or faces thereof a respective friction disk or plate member 12 and 13. Each such friction disk or plate 12 and 13 is arranged coaxially with respect to the pusher floor member 4 and essentially parallel thereto. The attachment thereof may be accomplished by a number of connection rod members 24 or equivalent structure, each of which is arranged between the pusher floor member 4 and the related friction disk or plate 12 or 13, as the case may be. Between the pusher floor member 4 and each of the friction disks or plates 12 and 13 there is thus formed a respective intermediate space 55 for the throughflow of the suspension which is to be separated in the direction of the sieve or filter surface 2″ of the sieve drum or drum member 2. The friction disk 13 mounted at the side or face of the pusher floor member 4 which confronts the feed or supply pipe 8 is provided with a central opening 14 for the throughpassage of the feed pipe 8, as best recognized by referring to FIG. 4. These friction disks or plates 12 and 13 therefore serve to direct the flow of the suspension or the like into the space of the sump 28 and to prevent any spraying of the suspension into the remaining inner region of the sieve or friction drum 2. In conjunction with the wall of the friction floor member 4 they accelerate the movement of the suspension in radial direction.

The assembled together structure or unit composed of the pusher floor member 4 and the frictions disks or plates 12 and 13 is appropriately mounted, rotated and displaced by means of, for instance, a shaft member 25 which is secured to one of the friction disks or plates, here the friction disk 12.

Figure 6:
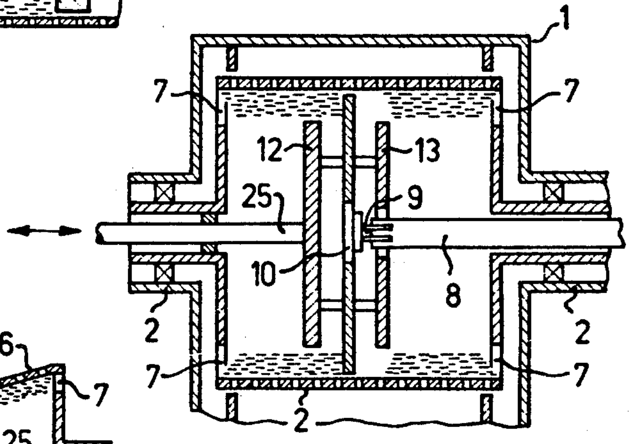
FIG. 6 is a longitudinal sectional view illustrating a further embodiment of pusher centrifuge.

While in the exemplary embodiment of pusher centrifuge depicted in detail in FIGS. 1 and 2 the sieve or filter drum 2 is arranged in a cantilever or overhang fashion in the housing 1, the modified exemplary embodiment of pusher centrifuge as depicted in FIG. 6 contemplates mounting the sieve or friction drum 2 at both sides or ends thereof within the centrifuge housing 1.

Figure 7:
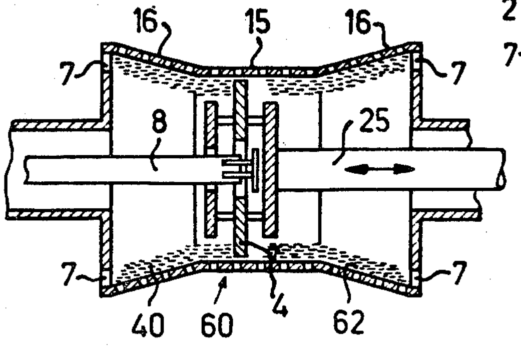
FIG. 7 is a longitudinal sectional view depicting a possible further construction of the sieve or filter drum.

With the exemplary embodiment depicted in FIG. 7 there can be constructed a pusher centrifuge according to the invention, wherein the sieve or filter drum, here generally indicated by reference numeral 60, is provided at its central region with a substantially cylindrical portion or section 15 which merges at both ends thereof with a related conically widening portion or section 16 located at both ends of such flared sieve drum 60. The conically widening portions 16 of the sieve drum widen in the direction of the related outlet or discharge opening 7. This sieve or filter drum 60 is mounted at both of its ends or sides in the related housing which is here not particularly shown. The pusher floor member 4 is displaceably arranged for movement along the cylindrical portion 15 of the sieve or filter drum 60. With such construction of sieve drum 60 there is rendered possible, on the one hand, an extension or prolongation of the sieve or filter surfaces 62 of the sieve or filter drum 60, and at the same time there is also facilitated the transport of the filter cake 40 and its discharge through the outlet or discharge openings 7 along such an extended or prolonged sieve or filter surface 62.

Continuing, the construction of pusher centrifuge depicted by way of example in FIGS. 1, 2 and 5, is advantageously provided with washing devices 17 and 18 for washing the filter cake 40 at the sieve or filter surface 2″ of the sieve drum 2. As shown in FIGS. 1 and 5, the washing device 17 possesses a body member 21 which is installed in the internal space or compartment 65 of the sieve or filter drum 2 and is appropriately secured, for instance bolted to the end wall 70 of such sieve or filter drum 2. Extending through the body member 21 are lines or conduits 22 which lead to outflow spray nozzles 23 or the like, by means of which a suitable washing liquid can be propelled in the direction of the filter cakes 40 towards the sieve or filter surface 2″ of the sieve drum 2. The washing liquid is infed through a line or conduit 19 and is conducted into a trough or reservoir 20 or equivalent structure located at the wall 70 of the sieve or filter drum 2, from which lead the aforementioned lines or conduits 22 to the spray nozzles 23. As clearly shown by referring to FIG. 5, the body member 21 can advantageously serve to provide an additional mounting or bearing arrangement for the shaft member 25 which carries the unit or assembly composed of the pusher floor member 4 and the two friction disks 12 and 13. At the other side of the pusher centrifuge it is possible to accomplish the washing of the filter cake 40 by means of a number of pipe or conduit members 18 constituting the aforementioned washing device 18. The washing liquid is conducted through these pipes or conduits 18 into the internal space or compartment 65 of the sieve or filter drum 2.

Figure 8:
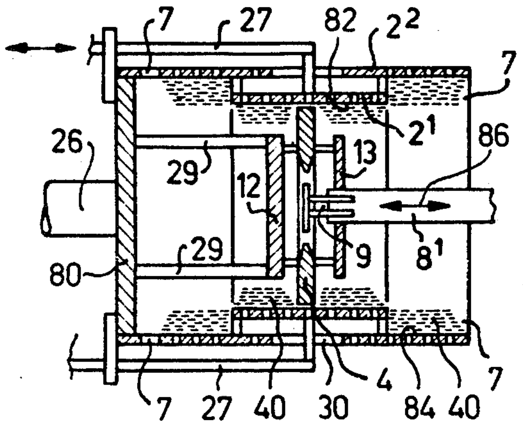
FIG. 8 schematically illustrates a further possible construction of pusher centrifuge which is designed as a double-stage pusher centrifuge.

FIG. 8 schematically illustrates a double-stage centrifuge constructed according to the invention. Here two internested sieve or filter drums $2^1$ and $2^2$ are provided which form a double-stage operating centrifuge or centrifugal separator. The outer sieve drum $2^2$ can be rotated by means of a shaft member 26 which is secured at its end wall 80. At this end wall 80 there is also attached by means of the rods 29 or equivalent connection structure the unit or assembly composed of the pusher floor member 4 and the friction disks or plates 12 and 13. The pusher floor member 4 is thus arranged at the center of the sieve or friction drum $2^2$. The other inner sieve or friction drum $2^1$ is arranged in internested or interfitting fashion within the outer sieve or filter drum $2^2$ and is displaceable relative thereto axially in the lengthwise direction thereof. For the purpose of accomplishing this lengthwise axial oscillating to-and-fro displacement of the inner sieve or filter drum $2^1$ there are provided traction rods 27 or equivalent structure, which extend through slots 30 provided at the outer sieve drum $2^2$ into the interior of such sieve drum $2^2$ and are then operatively connected with the other inner sieve or filter drum $2^1$. The assembly composed of the pusher floor member 4 and the friction disks or plates 12 and 13 rotate in conjunction with the outer sieve drum $2^2$ and is here not displaceable in the lengthwise axial direction relative to such sieve or filter drum $2^2$. A relative displacement between the pusher floor member 4 and the sieve drum $2^1$ of the first stage of the double-stage centrifuge is accomplished by displacing this sieve or filter drum $2^1$ by means of the traction rods 27. By virtue of such lengthwise axial oscillating displacement of the sieve or filter drum $2^1$ there are transported the filter cakes 40 at the sieve or filter surface 82 of the sieve drum $2^2$, so that such filter cakes 40 will be displaced onto the sieve or filter surface 84 of the sieve or filter drum $2^2$ of the second stage, and such filter cakes 40 then simultaneously also will be displaced along the sieve or filter surface 84 of the sieve drum $2^2$ of the second stage in the direction of the related outlet or discharge openings 7, to both sides of the sieve drum $2^2$, and then at that location effluxes from the double-stage centrifuge in the form of the processed product.

The relative displacement between the outlet or outflow opening 9 of the feed or supply pipe $8^1$ and the pusher floor member 4, which here is arranged so as to be non-displaceable in the lengthwise axial direction, in other words remains in its position in its lengthwise axial direction, is realized by providing a lengthwise axial oscillating displacement movement of the feed or supply pipe $8^1$, as generally schematically indicated by the double-headed arrow 86. Both of the displacement movements, namely, the displacement of the sieve drum $2^1$ relative to the pusher floor member 4 and the displacement of the feed or supply pipe $8^1$ relative to the pusher floor member 4, are advantageously accomplished in cycle with one another.

It would also be possible in similar fashion to construct multi-stage centrifuges in accordance with the teachings of the invention.

While there are shown and described present preferred embodiments of the invention, it is to be distinctly understood that the invention is not limited thereto, but may be otherwise variously embodied and practiced within the scope of the following claims. Accordingly,

What I claim is:

1. A pusher centrifuge for treatment of a product, especially a suspension comprising:
- a housing;
- at least one sieve drum having opposed end regions and rotatably mounted in said housing;
- a substantially disk-shaped pusher member rotatably arranged within said sieve drum and substantially coaxially positioned with respect to said sieve drum;
- said pusher member and said sieve drum being movable to-and-fro relative to one another in the lengthwise direction of the sieve drum between two predetermined deflection points;
- said sieve drum having a filter surface at least a portion of which defines a longitudinal section;
- said longitudinal section of said sieve drum defines respective sump regions located at opposite sides of said pusher member;
- means defining discharge openings for filter cakes formed from the product which is being processed in the centrifugal centrifuge;
- said pusher member wipingly contacting said longitudinal section of the filter surface of said sieve drum and serving for the displacement of a filter cake along said sieve drum in the direction towards the discharge openings provided for the filter cakes;
- said sieve drum having an imaginary center line;
- said deflection points being located to respective sides of said imaginary center line;
- a feed pipe for infeeding a suspension constituting the product which is to be separated into the sieve drum;
- said feed pipe constitutes a sole feed pipe for infeeding the suspension;
- said feed pipe being arranged substantially coaxially with respect to said sieve drum;
- said feed pipe having an outflow opening which extends radially outwardly with respect to said feed pipe;
- said outflow opening of said feed pipe being located at a central region between both of said deflection points of said pusher member;
- said pusher member possessing a substantially central opening defining a free passage through which the feed pipe extends through said pusher member, so that the outflow opening of said feed pipe during the relative to-and-fro displacement of the pusher member and said outflow opening of said feed pipe is alternately located to the one or other side of said pusher member; and
- said discharge openings for the filter cakes being located at the region of said opposed end regions of said sieve drum.

2. The pusher centrifuge as defined in claim 1, wherein:
- said pusher member comprises a pusher floor member.

3. The pusher centrifuge as defined in claim 2, wherein:
- said pusher floor member is displaceable to-and-fro between said deflection points relative to the sieve drum in the lengthwise direction thereof.

4. The pusher centrifuge as defined in claim 2, wherein:
- said pusher floor member has a wall delimiting said central opening; and
- said wall possessing a substantially wedge-shaped cross-sectional configuration extending towards the direction of flow of the suspension out of said feed pipe in order to distribute the flow of the suspension which outflows in a radially outward direction.

5. The pusher centrifuge as defined in claim 2, further including:
- a respective friction disk member arranged to opposite sides of said pusher floor member;
- each friction disk member being disposed essentially coaxially and parallel with respect to said pusher floor member;
- each said friction disk member and the pusher floor member defining therebetween an intermediate space for throughflow of the suspension which is to be separated in the direction of the sieve drum; and
- said friction disk member arranged at a side of the pusher floor member confronting the feed pipe being provided with a substantially central opening for the throughpassage of the feed pipe.

6. The pusher centrifuge as defined in claim 2, wherein:
- said sieve drum possesses a substantially cylindrical portion having opposed ends;

a respective conical portion widening in the direction of a related one of said discharge openings and merging with each opposed end of said cylindrical portion;

said sieve drum being mounted at both opposed end regions within said housing; and said pusher floor member being displaceably arranged for movement along said cylindrical portion.

7. The pusher centrifuge as defined in claim 1, further including:

washing means for washing filter cakes present at the filter surface of the sieve drum.

8. The pusher centrifuge as defined in claim 2, further including:

an additional sieve drum;

said two sieve drums being arranged internested with respect to one another so as to form a double-stage centrifuge;

one of the sieve drums forming the sieve drum of the first stage and the other sieve drum the sieve drum of the second stage;

the sieve drum of the first stage being displaceable in axial direction relative to the pusher floor member and with respect to the sieve drum of the second stage;

the filter cakes being movable along the sieve drum of the second stage during such relative movement; and said feed pipe being displaceable relative to the pusher floor member which remains in its lengthwise axial position with respect to said sieve drum of the second stage.

9. The pusher centrifuge as defined in claim 1, wherein:

said sole feed pipe having said outflow opening thereof arranged with respect to said pusher member such that during the relative movement of said pusher member and said sieve drum with respect to one another, and during a corresponding change in the relative position of the sole feed pipe and the pusher member, the infed suspension is automatically delivered to the one or the other side of the pusher member.

10. The pusher centrifuge as defined in claim 1, wherein:

the relative movement of said pusher member and said sieve drum being accomplished in relation to the infeed of the suspension through the feed pipe such that the suspension only first enters a respective sump of said sieve drum when such sump has been freed of any filter cake located therein by virtue of the relative displacement between the pusher member and the sieve drum.

* * * * *